United States Patent
Thompson (10) Patent No.: US 11,960,859 B2
(45) Date of Patent: Apr. 16, 2024

(54) AUTOMATED PROCESS FOR DISCOVERING OPTIMAL PROGRAMS AND CIRCUITS IN NEW COMPUTING PLATFORMS

(71) Applicant: The Boeing Company, Chicago, IL (US)

(72) Inventor: Richard Joel Thompson, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 126 days.

(21) Appl. No.: 17/454,685

(22) Filed: Nov. 12, 2021

(65) Prior Publication Data
US 2023/0153074 A1    May 18, 2023

(51) Int. Cl.
| G06F 8/20 | (2018.01) |
| G06F 9/455 | (2018.01) |
| G06N 10/00 | (2022.01) |

(52) U.S. Cl.
CPC .............. *G06F 8/20* (2013.01); *G06F 9/455* (2013.01); *G06N 10/00* (2019.01)

(58) Field of Classification Search
CPC ............ G06F 8/20; G06F 9/455; G06F 8/443; G06N 10/00; G06N 10/60; G06N 10/80; G06N 10/70

See application file for complete search history.

(56) References Cited

U.S. PATENT DOCUMENTS

| 2003/0169041 A1* | 9/2003 | Coury ................... B82Y 10/00 324/307 |
| 2018/0276555 A1* | 9/2018 | Weichenberger ...... G06N 10/00 |
| 2022/0084123 A1* | 3/2022 | Ramesh ................. G06Q 40/06 |

OTHER PUBLICATIONS

T S Humble et al.; An integrated programming and development environment for adiabatic quantum optimization; IOP; 28 pages; retrieved on Nov. 29, 2023. (Year: 2014).*
Thomas Haner et al.; Assertion-Based Optimization of Quantum Programs; ACM; 20 pages; retrieved on Nov. 29, 2023 (Year: 2020).*
Cincio et al., "Learning the quantum algorithm for state overlap," New Journal of Physics, Mar. 2018, 10 pages.

* cited by examiner

*Primary Examiner* — S. Sough
*Assistant Examiner* — Cuong V Luu
(74) *Attorney, Agent, or Firm* — Yee & Associates, P.C.

(57) ABSTRACT

A method for discovering optimal algorithms is provided. The method comprises defining a starting condition for a program defining a number of program targets, wherein the program targets map program user-specified inputs to expected outputs, defining a number of program objectives, and defining a number of program constraints. An iterative optimization problem is then initialized to solve for the resulting program. A determination is made if defined termination conditions have been met according to the program targets and optimization objectives. Responsive to the defined termination conditions not being met an update to the program is selected by addition or subtraction of operations, the updated program is evaluated according to the program targets, the number of program objectives are evaluated, and the optimization problem is re-iterated. Responsive to the defined termination conditions being met, the program is reassembled into an instruction set.

41 Claims, 8 Drawing Sheets

AUTOMATED PROCESS FOR DISCOVERING OPTIMAL PROGRAMS AND CIRCUITS IN NEW COMPUTING PLATFORMS

BACKGROUND INFORMATION

1. Field

The present disclosure relates generally to computing system, more specifically, to an automated method for designing optimal program and circuits.

2. Background

Advanced algorithm development can be difficult and time consuming. Particularly in the case of quantum computers, quantum algorithm development may also be counterintuitive due to dependence on quantum-mechanical behavior such as quantum entanglement and superposition. At present, the primary solution to algorithm development is to manually design a program or circuit, which might be performed on a classical simulation tool or directly on hardware, either classical or quantum.

Therefore, it would be desirable to have a method and apparatus that take into account at least some of the issues discussed above, as well as other possible issues.

SUMMARY

An illustrative embodiment provides a computer-implemented method for discovering optimal algorithms. The method comprises defining a starting condition for a program defining a number of program targets, wherein the program targets map program user-specified inputs to expected outputs, defining a number of program objectives, and defining a number of program constraints. An iterative optimization problem is then initialized to solve for the resulting program. A determination is made if defined termination conditions have been met according to the program targets and optimization objectives. Responsive to the defined termination conditions not being met an update to the program is selected by addition or subtraction of operations, the updated program is evaluated according to the program targets, the number of program objectives are evaluated, and the optimization problem is re-iterated. Responsive to the defined termination conditions being met, the program is reassembled into an instruction set.

Another illustrative embodiment provides a system for discovering optimal algorithms. The system comprises a storage device configured to store program instructions and one or more processors operably connected to the storage device and configured to execute the program instructions to cause the system to: define a starting condition for a program; define a number of program targets, wherein the program targets map program user-specified inputs to expected outputs; define a number of program objectives; define a number of program constraints; initialize an iterative optimization problem to solve for the program; determine if defined termination conditions have been met according to the program targets and optimization objectives; responsive to the defined termination conditions not being met: select an update to the program by addition or subtraction of operations; evaluate the program according to the program targets; evaluating the number of program objectives; and re-iterating the optimization problem; and responsive to the defined termination conditions being met, reassemble the program into an instruction set.

Another illustrative embodiment provides a computer program product for discovering algorithms. The computer program product comprises a computer-readable storage medium having program instructions embodied thereon to perform the steps of: defining a starting condition for a program; defining a number of program targets, wherein the program targets map program user-specified inputs to expected outputs; defining a number of program objectives; defining a number of program constraints; initializing an iterative optimization problem to solve for the program; determining if defined termination conditions have been met according to the program targets and optimization objectives; responsive to the defined termination conditions not being met: selecting an update to the program by addition or subtraction of operations; evaluating the program according to the program targets; evaluating the number of program objectives; and re-iterating the optimization problem; and responsive to the defined termination conditions being met, reassembling the program into an instruction set.

Another illustrative embodiment provides a computer-implemented method for discovering optimal quantum computing algorithms. The method comprises defining a starting condition for a program defining a number of program targets, wherein the program targets map program user-specified inputs to expected outputs, defining a number of program objectives, and defining a number of program constraints. An iterative optimization problem is then initialized to solve for the resulting program. A determination is made if defined termination conditions have been met according to the program targets and optimization objectives. Responsive to the defined termination conditions not being met an update to the program is selected by addition or subtraction of operations, the updated program is evaluated according to the program targets, the number of program objectives are evaluated, and the optimization problem is re-iterated. Responsive to the defined termination conditions being met, the program is reassembled into a quantum instruction set.

Another illustrative embodiment provides a system for discovering optimal quantum computing algorithms. The system comprises a storage device configured to store program instructions and one or more quantum processors operably connected to the storage device and configured to execute the program instructions to cause the system to: define a starting condition for a program; define a number of program targets, wherein the program targets map program user-specified inputs to expected outputs; define a number of program objectives; define a number of program constraints; initialize an iterative optimization problem to solve for the program; determine if defined termination conditions have been met according to the program targets and optimization objectives; responsive to the defined termination conditions not being met: select an update to the program by addition or subtraction of operations; evaluate the program according to the program targets; evaluate the number of program objectives; and re-iterate the optimization problem; and responsive to the defined termination conditions being met, reassemble the program into a quantum instruction set.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that advanced algorithm development can be difficult and time consuming. Quantum computers require sophisticated algorithmic programming in order to realize speedups over traditional classical computing approaches. Quantum algorithm development is extremely difficult, time-consuming, and counterintuitive, due to the dependence on quantum-mechanical behavior such as quantum entanglement and superposition.

The illustrative embodiments also recognize and take into account that quantum computers are likely to provide enormous computing advantages for specific tasks possibly including materials modeling, optimization, machine learning, and cryptography. However, the development of a quantum algorithm to solve a particular problem is an extremely challenging task, let alone developing an algorithm that actually realizes a speedup over traditional computing approaches.

The illustrative embodiments also recognize and take into account that at present, the primary existing solution is to manually construct a program or circuit. These constructions can be done either on a classical simulation tool or directly on a quantum computer. Classical simulation tools are limited since the representation of quantum memory in a classical computer grows exponentially with the size of the quantum memory. Presently, quantum hardware is limited in availability and noise characteristics.

The illustrative embodiments provide a method for program and circuit design that allow a user to specify a series of program targets, which indicate a set of inputs and desired corresponding outputs that an algorithm should produce. The method then solves an optimization problem to compute the program instructions that would best meet the desired inputs/outputs. A discrete optimization formulation can be used to enforce hard constraints on the satisfaction of the algorithm's specified inputs and outputs.

The illustrative embodiments treat the program or circuit itself as the unknown and allow the user to specify inputs and outputs, thereby relieving the user from having to create the program or circuit manually. The illustrative embodiments can minimize circuit depth of an existing or known algorithm or program. Presently, the circuit depth can be a significant limiting factor in the ability to implement a quantum algorithm on a quantum computer. Being able to minimize the circuit depth means that larger and more effective quantum algorithms can be realized faster.

The illustrative embodiments can also be used to convert a known algorithm or program into an alternate set of quantum gates. For example, such application may be useful if a quantum program is available for an ion trap computer (where rotation operations may be used frequently) and is needed to be applied on a superconducting system (where rotation operations may not be available).

Although quantum computing is one particular application, the illustrative embodiments are not limited to quantum systems and could be used to generically predict an algorithm for any computing platform or emerging technology, such as modern digital computers, field-programmable gate arrays, analog or digital systems, DNA computing, optical computing, etc.

Figure 1:
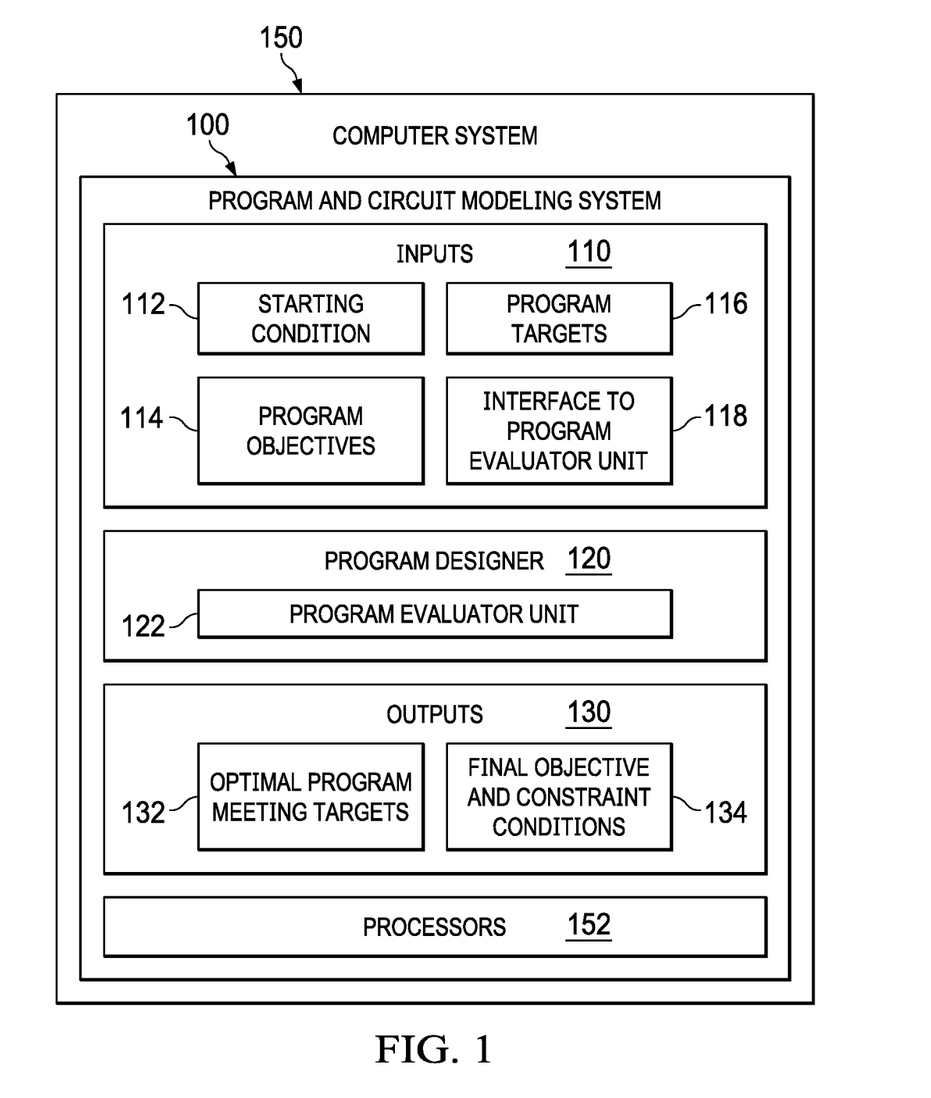
FIG. 1 depicts a block diagram illustrating a program and circuit modeling system in accordance with an illustrative embodiment.

Turning now to FIG. 1, an illustration of a block diagram of program and circuit modeling system is depicted in accordance with an illustrative embodiment. Program and circuit modeling system 100 comprises a program designer 120 that constructs an algorithm according to specified inputs 110 and specified outputs 130.

Inputs 110 comprise an initial starting condition 112, program objectives 114, program targets 116, and an interface to program evaluator unit 118 to a program evaluator unit 122 in program designer 120. Initial starting condition 112 may comprise a starting guess for a program by a user, an existing program, or a blank program. Program objectives 114 specify what objectives with regard to which the user wants to optimize the program. Program targets 116 comprise a dictionary of mapped key/value pairs. The key indicates the input provided to the program, and the value indicates the resulting output generated by the program from the corresponding input. For example, a program target for creating a single-step program to negate the binary value of an input might look like:

{INPUT:0→OUTPUT:1, INPUT:1→OUTPUT:0}

The above example specifies that the program could take two possible input values, 0 or 1, and the result should be the inverse, 1 or 0, respectively.

The interface to program evaluator unit 118 provides an access and interface with the program evaluator unit 122, which may comprise a classical simulation process that simulates hardware such as a quantum memory or could be an actual hardware system such as a quantum computer.

Outputs 130 comprise an optimal program or circuit that meets the program target 132 and final objective and constraint conditions 134.

Program and circuit modeling system 100 can be implemented in software, hardware, firmware, or a combination thereof. When software is used, the operations performed by program and circuit modeling system 100 can be implemented in program code configured to run on hardware, such as a processor unit. When firmware is used, the operations performed by program and circuit modeling system 100 can be implemented in program code and data and stored in persistent memory to run on a processor unit. When hardware is employed, the hardware may include circuits that operate to perform the operations in program and circuit modeling system 100.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components for program and circuit modeling system 100 can be located in computer system 150, which is a physical hardware system and includes one or more data processing systems. When more than one data processing system is present in computer system 150, those data processing systems are in communication with each other using a communications medium. The communications medium can be a network. The data processing systems can be selected from at least one of a computer, a server computer, a tablet computer, or some other suitable data processing system.

For example, program and circuit modeling system 100 can run on one or more processors 152 in computer system 150. As used herein a processor is a hardware device and is comprised of hardware circuits such as those on an integrated circuit that respond and process instructions and program code that operate a computer. When processors 152 execute instructions for a process, one or more processors can be on the same computer or on different computers in computer system 150. In other words, the process can be distributed between processors 152 on the same or different computers in computer system 150. Further, one or more processors 152 can be of the same type or different type of processors 152. For example, one or more processors 152 can be selected from at least one of a single core processor, a dual-core processor, a multi-processor core, a general-purpose central processing unit (CPU), a graphics processing unit (GPU), a quantum processing unit (QPU), a digital signal processor (DSP), or some other type of processor.

Figure 2:
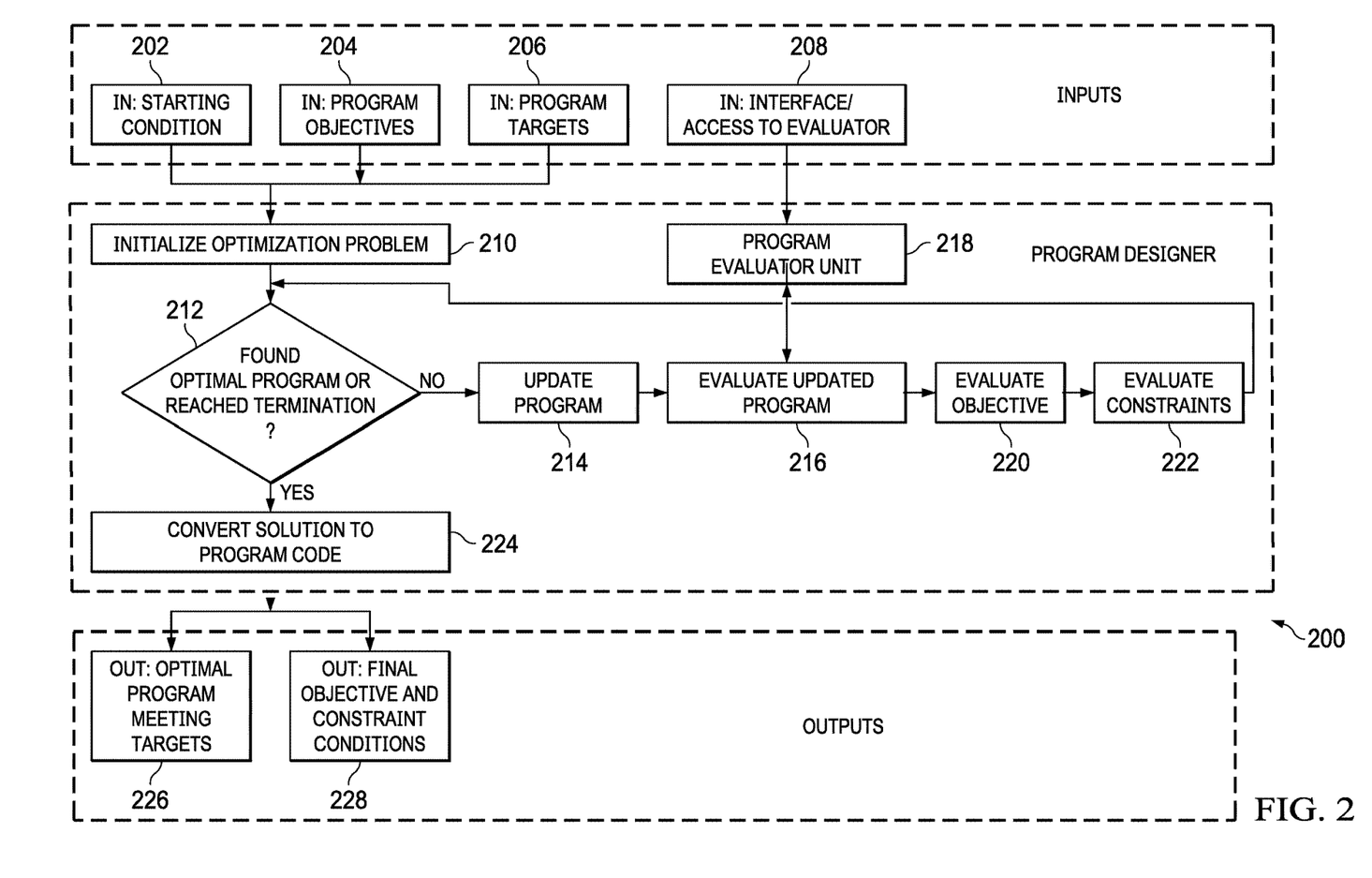
FIG. 2 depicts a flow diagram illustrating a process of automated program and circuit design in accordance with an illustrative embodiment.

FIG. 2 depicts a flow diagram illustrating a process of automated program and circuit design in accordance with an illustrative embodiment. Process flow 200 may be implemented in program and circuit modeling system 100 shown in FIG. 1.

Process flow 200 sets up an integer optimization problem to solve that encodes the program effects. This process might comprise encoding quantum program effects on quantum memory. In the initialization operation 210, this process may involve the allocation of variables and/or constraints in memory, any pre-computed values or matrices that will be used in the process, initialization of the solution and objective, etc., according to starting condition 202, program objectives 204, and program targets 206.

The subsequent optimization occurs in multiple iterations. For each iteration, a program branch is evaluated (operation 212) as to whether specified termination conditions for the optimization have been met. This evaluation might include optimality conditions found on the objective of the best solution determined so far, a maximum time, or iteration count, etc. If termination has not yet been reached, the following steps are executed to perform another iteration.

The program is updated (operation 214). This operation determines improvements to be made to the current quantum program that would hopefully increase the objective value.

The program is evaluated (operation 216). This operation performs a calculation of the results of the memory after program execution. This operation can interface with a program evaluator unit 218, which might comprise classical simulation of a processor (e.g., quantum processor) that computes the full memory state after program execute or could interface with an actual quantum processor unit (QPU) on real hardware, which might be much faster and more efficient than a classical simulation. Interface 208 allows the user to access program evaluator unit 218.

Once the program has been assembled and executed, the process evaluates the objectives in (operation 220) and evaluates the constraints (operation 222) for the updated program. These operations ensure that the program objectives 204 have hopefully improved, and also verify that the program targets 206 provided by the user are ensured to be correct. Subsequent iteration continues to improve the quantum program until either optimality conditions or some other termination conditions (e.g., maximum specified number of iterations) are reached.

In the final operation, the resulting program is reassembled into program code or a circuit diagram to display the results to the user (operation 224). The results from this step represent the final desired output, which comprises an algorithm that best meets the specified program objectives 204 while ensuring that the assigned program targets 206 (inputs mapped to particular outputs) are enforced. Additionally, metric information results from the optimization may be printed to the user as well, such as the objective value achieved and/or constraint evaluations.

Figure 3:
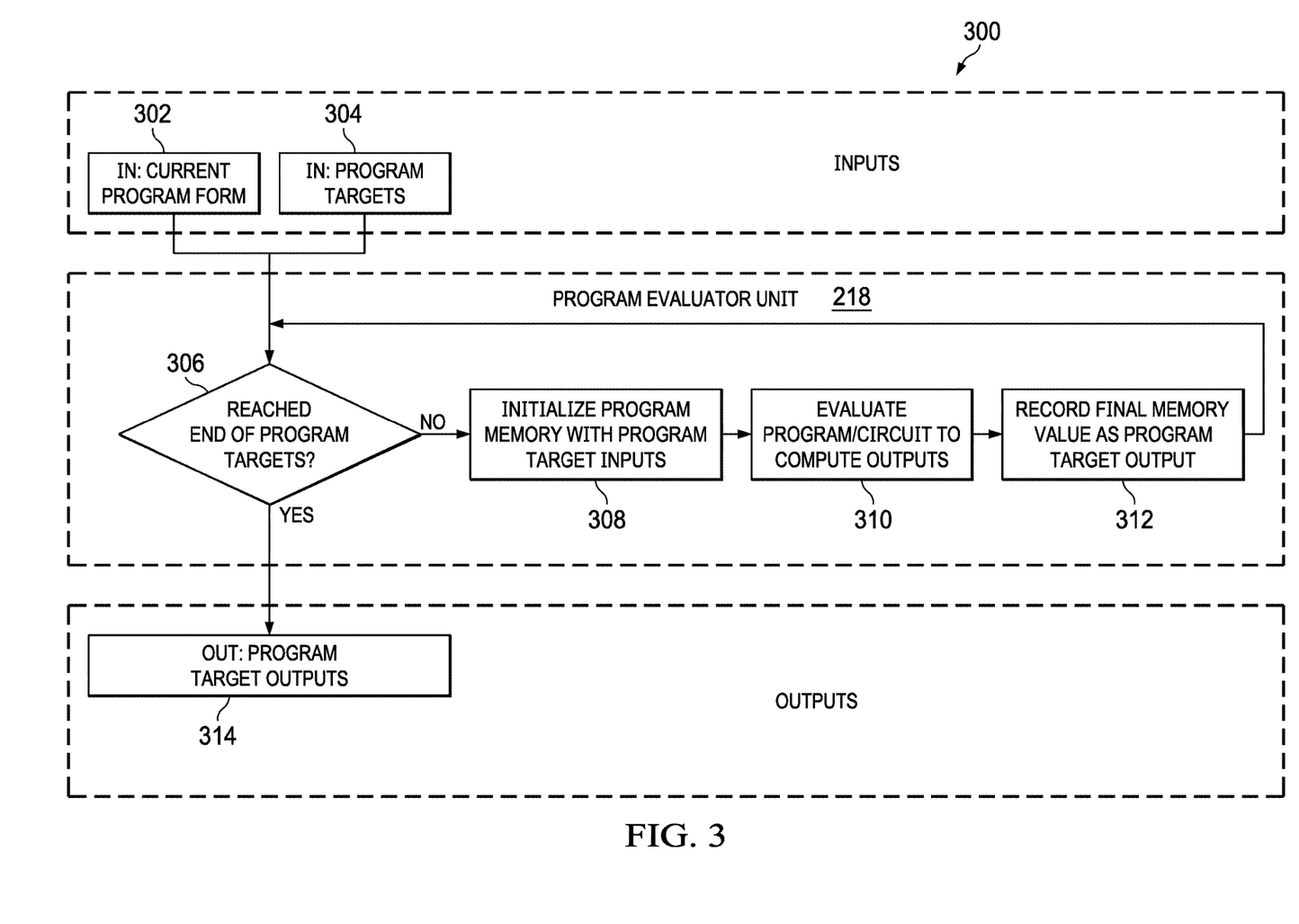
FIG. 3 depicts a process flow for a program evaluator unit in accordance with an illustrative embodiment.

FIG. 3 depicts a process flow for a program evaluator unit in accordance with an illustrative embodiment. Process flow 300 is an example of how program evaluator unit 218 may operate during evaluation of the updated program in operation 216 in FIG. 2.

The program evaluator unit 218 is designed to calculate what the program predicts as outputs for the given set of inputs in the program targets. The program evaluator unit 218 takes a current form 302 of the program/circuit during the optimization loop and executes (or simulates execution of) the program/circuit for all of the program targets 304 to determine the current value of their outputs. The outputs computed by the program evaluator unit 218 are then fed into the "Evaluate Objectives" block 220 in FIG. 2. Ideally, upon convergence of the optimization loop, the outputs produced by the current program/circuit should match perfectly to user-specified outputs in the program targets.

FIG. 3 depicts a generic form of the program evaluator unit 218. In determining whether the end of program target have been reached (operation 306), the evaluator loops over all the program targets 304. For each program target, there is a specified input and expected output. The program evaluator unit 218 initializes the representation of the device memory to the set of target inputs (operation 308), and then executes (or simulates execution of) the device to see what outputs are produced from the inputs (operation 310). The outputs are recorded (operation 312) and passed on as program target outputs 314 to the Evaluate Objectives operation 220 in FIG. 2, where the difference of the outputs relative to the user-specified target outputs is used to help drive an update to the program/circuit.

Operation 310 may be performed in multiple manners, depending on the nature of the device for which the program/circuit is intended. For existing hardware, the computation in operation 310 could actually dispatch the program or circuit to a real instance of the hardware and measure the outputs on the hardware for recording. Alternately, a software representation or simulation may be used to perform computation in operation 310.

Figure 4:
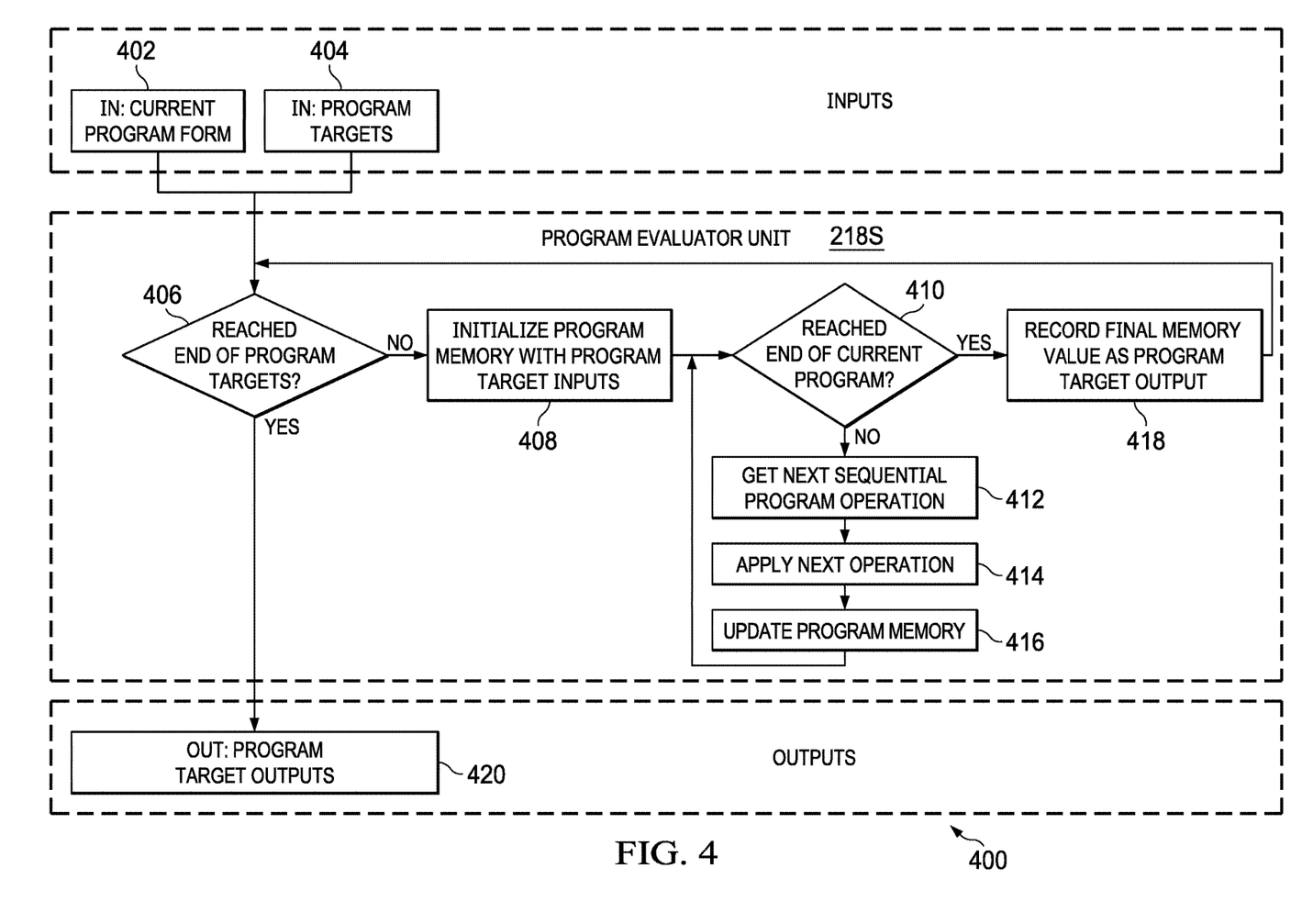
FIG. 4 depicts a process flow for a program evaluator unit employing software simulation of a target hardware device in accordance with an illustrative embodiment.

FIG. 4 depicts a process flow for a program evaluator unit employing software simulation of a target hardware device in accordance with an illustrative embodiment. Process flow 400 is an example of how program evaluator unit 218S may employ software simulation of hardware during evaluation of the updated program in operation 216 in FIG. 2.

Similar to FIG. 3, program evaluator unit 218S takes a current form 402 of the program/circuit loops 406 over all the program targets 404 and simulates execution of the program/circuit for all of the program targets to determine the current value of their outputs 420.

The program evaluator unit 218S initializes 408 the program memory with the program target inputs. A determination is made as to whether the end of the current program has been made (operation 410). As a result, the determination enables the evaluation for each specific set of inputs is performed by iterating over the circuit's sequentially arranged operations (either ordered circuit gates or ordered lines of instruction code) and sequentially performing each operation upon a virtual representation of the program memory. During simulation of execution, if the end of the current program has not been reached, program evaluator unit 218S retrieves the next sequential program (operation 412), applies that next operation (operation 414), and updates program memory (operation 416) in an iterative loop until reaching the end of the program. These steps may be implemented using heuristic or abstract model representations or using a mathematical model. At the end of the current program for a given program target the final memory value is recorded (operation 418) as the program target output.

Figure 5:
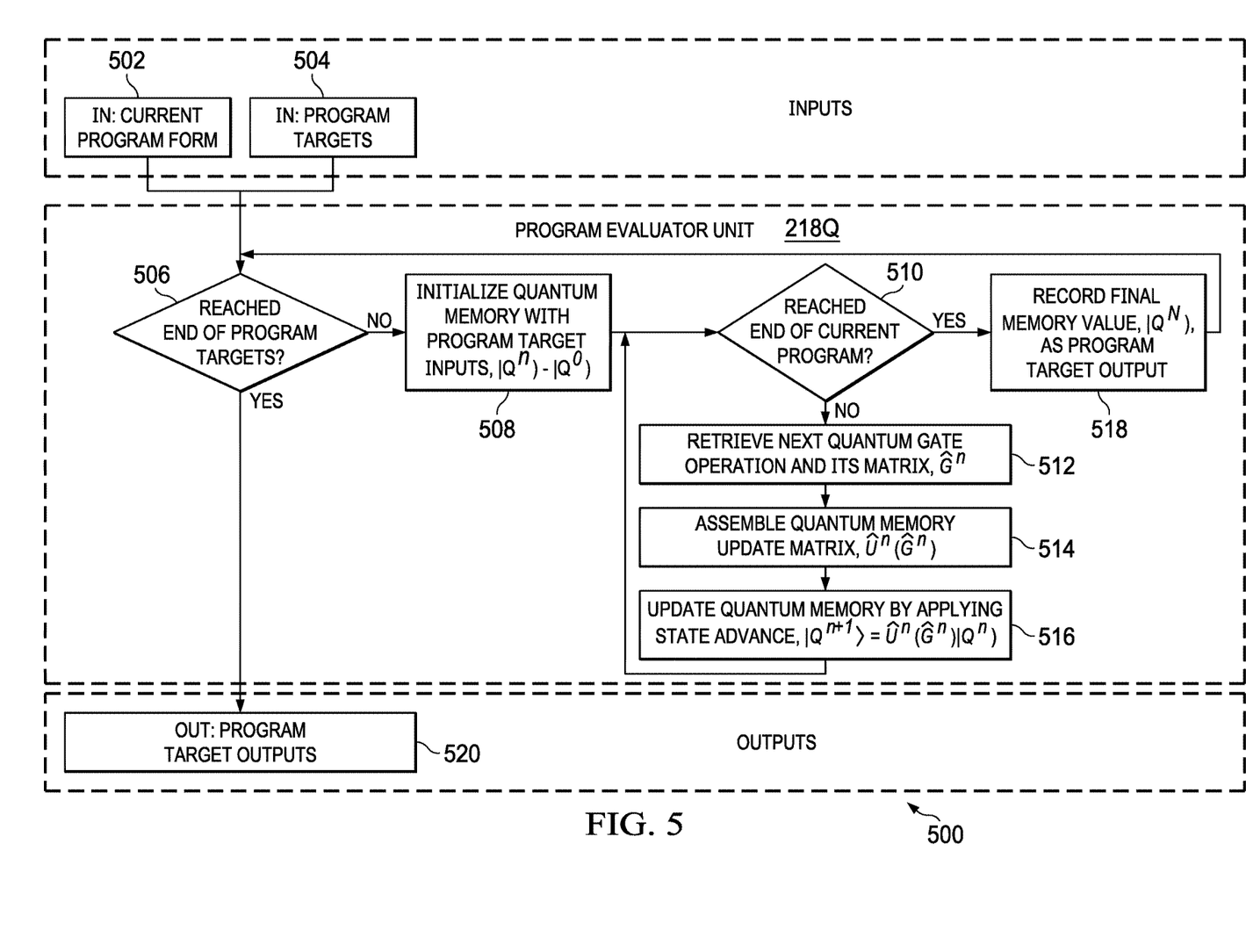
FIG. 5 depicts a process flow for a program evaluator unit employing software simulation of a quantum computing device in accordance with an illustrative embodiment.

FIG. 5 depicts a process flow for a program evaluator unit employing software simulation of a quantum computing device in accordance with an illustrative embodiment. Process flow 500 is an example of how program evaluator unit 218Q employing software simulation of quantum hardware during evaluation of the updated program in operation 216 in FIG. 2.

Similar to FIGS. 3 and 4, program evaluator unit 218Q takes a current form 502 of the program/circuit loops over all the program targets 504 by determining whether the end of the current program has been reached (operation 510) and simulates execution of the program/circuit for all of the program targets to determine the current value of their outputs 520.

A mathematical model is implemented to represent the quantum memory's Hilbert space spanned by the qubits available. A generic memory state of the computer can be represented as $|Q^n\rangle$, where n indicates a time-step starting at zero (the initial state, $|Q^0\rangle$) (operation 508) and incrementing per operation performed to a final value N (the final state, $|Q^N\rangle$) (operation 518). The program simulation involves iterating (operation 510) over the ordered sequential set of quantum gates. For each quantum gate applied, the gate matrix representation, $\hat{G}^n$, is constructed (this is unique per gate). This matrix shall apply to the qubits on which the gate operates and is retrieved with the respective quantum gate operation (operation 512). Generally, quantum gates are of a single-, two- and three-qubit variety.

In operation 514, a full state matrix is assembled to update the entire quantum memory operation. The remaining qubits in the quantum memory are applied with an identity matrix, $\hat{I}^n$, which shall not affect those qubits. The full state update matrix, $\hat{U}^n$, is assembled via Kronecker products of the quantum gate and identity matrices for the remaining qubits, $\hat{U}^n = \{\ldots \times \hat{I}^n \times \hat{I}^n \times \ldots\} \times \hat{G}^n \times \{\ldots \times \hat{I}^n \times \hat{I}^n \times \ldots\}$. The quantum memory state is updated by application of the state update matrix to the current memory state, $|Q^{n+1}\rangle = \hat{U}^n |Q^n\rangle$ (operation 516).

This process is iteratively performed for all sequential gate operations supplied in the current quantum program/circuit arrangement, and the final output value is recorded (operation 518). Controlled-gate or controlled-controlled-gate two- and three-qubit operations can also be included in this process using projection matrices in the construction of the state updated matrix, $\hat{U}^n$.

For the specific instance of quantum computing, the final memory value recorded could be either the superposed state itself, $|Q^N\rangle$, or could be a stochastically sampled measurement of the final state. Effects such as noise may be included via noise models integrated into the operation 512, 514, and 516 using stochastic matrices, Gaussian noise models or specific hardware noise models. Effects of post-processing such as error mitigation techniques may be included in the recording of the final memory value (operation 518) as well.

The program evaluator may require several different approaches for effective use across a single device family. For example, in the specific case of quantum computers, the matrices used in the software simulation process shown in FIG. 5 scales exponentially with the size of the quantum memory (for m qubits, each state update matrix shall require $2^m \times 2^m$ components) and may become prohibitively expensive for simulating large quantum memories. In such cases, using approximated models, heuristic representations, machine-learned models or even actually dispatching and running the program/circuit directly on actual quantum computer hardware may become much more efficient for evaluating the outputs.

The mathematical formulation to optimize the program assumes a language of a simple number of single- and two-qubit gate operations (or, equivalently, possible program instructions), including a null operation that indicates no operation performed. The quantum program can then be expressed in binary matrix form as a matrix that describes which gate operation is performed at what line or step in the quantum program, $$C_{kl} = \begin{cases} 1, & \text{if gate or operation } l \text{ is used on line } k, \\ 0, & \text{otherwise} \end{cases}$$

The program is considered to have a maximum of N lines or steps, such that $k \in \{1, 2, \ldots, N\}$, and a maximum of M possible actions on any given line or step of the quantum program, such that $l \in \{1, 2, \ldots, M\}$. A natural requirement that results from the concept of a program is that a single operation must be performed on each line, $$\sum_l C_{kl} = 1, \forall k$$

The subsequent result in a quantum memory after program execution, $|Q^N\rangle$, could be determined two different ways. A first method would be that if quantum hardware were available, the current value of the quantum program may be executed on actual hardware directly to obtain the final quantum state. This approach would require access to a quantum computer and the results may suffer from noise, but this method may also scale better than a classical simulation approach as the size and number of gates available in the quantum program grows larger. An alternative method would be to use a classical simulation approach to compute the quantum memory state, which can be described using a discretized representation of each line's action on the quantum memory state. Assuming the quantum memory state starts in some initial state, $|Q^0\rangle$, and using the notation $|Q^k\rangle$ to represent the quantum memory state after application of the kth instruction in the quantum program, the quantum memory state will change per instruction k according to the recursive relation $$|Q^{k+1}\rangle = C_{k1} \cdot \hat{U}_1 |Q^k\rangle + C_{k2} \cdot \hat{U}_2 |Q^k\rangle + \ldots + C_{kM} \cdot \hat{U}_M |Q^k\rangle$$

Since on any line k all of the variables $C_{k1}$ will be zero except for only one, all of the above terms will vanish except the single operator, $\hat{U}_1$, to be enacted on that line. Calculating $|Q^k\rangle$ for all k sequentially will yield the final outcome of the quantum memory state, $|Q^N\rangle$.

The quantum program is to achieve some goal, which is provided in the form of program targets. Each program target describes an input set of data placed in the quantum memory, $|Q_{T=t}^0\rangle$, provided to the quantum program, and a final expected output state in the quantum memory after program execution, $|Q_{T=t}^N\rangle$. There may be a number of such provided input/output mappings, $t \in \{1, 2, \ldots\}$. The difference between the quantum program's actual final state, $|Q^N\rangle$, from the expected state, $|Q_{T=t}^N\rangle$, can be quantified using a quadratic value, $$D_{T=t} = ||Q^N\rangle - |Q_{T=t}^N\rangle|^2$$

A constraint can also be added to guarantee that the inputs provided to the quantum memory for each program target remains set to the required inputs for the program target, $|Q^0\rangle = |Q_{T=t}^0\rangle$.

A formulation could be used to minimize the sum of the total error differences across all provided program targets, $\Sigma_t D_{T=t}$. Alternately, the circuit depth of the program may be minimized, and the above total error differences in program output can be added as explicit constraints to ensure that they are obeyed.

Whereas most of the above has assumed interest in a quantum program, the general approach may be applied to any computing platform or system, including modern digital computers, quantum computers, or other forms of emerging computing, such as DNA or optical computing. The illustrative embodiments may require changes or updates to the ultimate forms implemented, but can still be used in this approach to generate a circuit or program that could be executed to meet the provided forms of inputs mapped to outputs given in the program targets.

Figure 6:
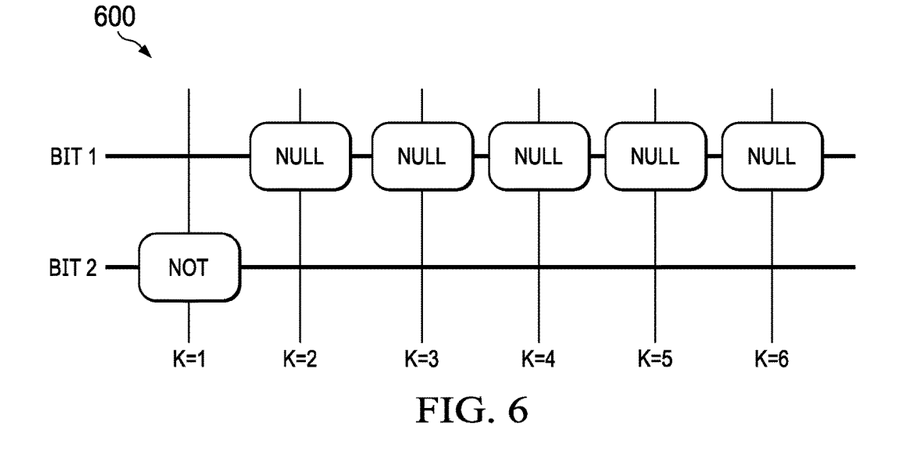
FIG. 6 depicts a diagram illustrating a result for a NOT gate operation in accordance with an illustrative embodiment.

FIG. 6 depicts a diagram illustrating a result for a NOT gate operation in accordance with an illustrative embodiment. NOT gate operation 600 may be implemented in program and circuit modeling system 100 in FIG. 1.

In the present example, a memory comprises only two bits and six logic gate operations, and the desired effect is to leave the first bit alone but provide a NOT operation on the second bit. A set of program targets can be written that represent this process as: {INPUT: 00→OUTPUT: 01, INPUT: 01→OUTPUT: 00, INPUT: 10→OUTPUT: 11, INPUT: 11→OUTPUT: 10}. With a set of standard digital logic gates available on the process, the result would be a single NOT gate applied to the second bit. No gate operation is required for the first bit.

As shown in FIG. 6, a NOT operation is applied to the second bit, and subsequently only NULL operations (non-operations which do not affect the memory state) are applied to the first bit. One can test that supplying the above INPUT sets for each program target in the dictionary results in the correct value that matches the corresponding OUTPUT in the same target. For example, sending the first of the program targets, 00, into the circuit shown in FIG. 6 would produce output 01.

Figure 7:
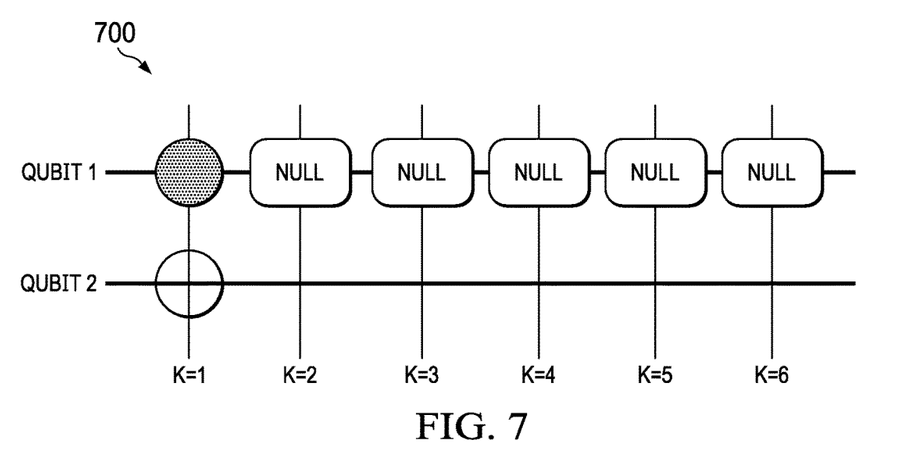
FIG. 7 depicts a diagram illustrating a result for a quantum CNOT gate operation in accordance with an illustrative embodiment.

FIG. 7 depicts a diagram illustrating a result for a quantum CNOT gate operation in accordance with an illustrative embodiment. Quantum CNOT gate operation 700 may be implemented in program and circuit modeling system 100 in FIG. 1.

In the present example, the following program targets are provided to the process: {INPUT: 00→OUTPUT: 00, INPUT: 01→OUTPUT: 01, INPUT: 10→OUTPUT: 11, INPUT: 11→OUTPUT: 10}. The example assumes a quantum computer with two qubits and six gate operation steps. Equipped with a language on the process that spans standard single-qubit and two-qubit gates, the solution should be a controlled-NOT gate operation applied with the control bit assigned to the first qubit, and the target bit assigned to the second qubit. FIG. 7 illustrates the expected product in the parlance of quantum circuit diagrams.

Figure 8:
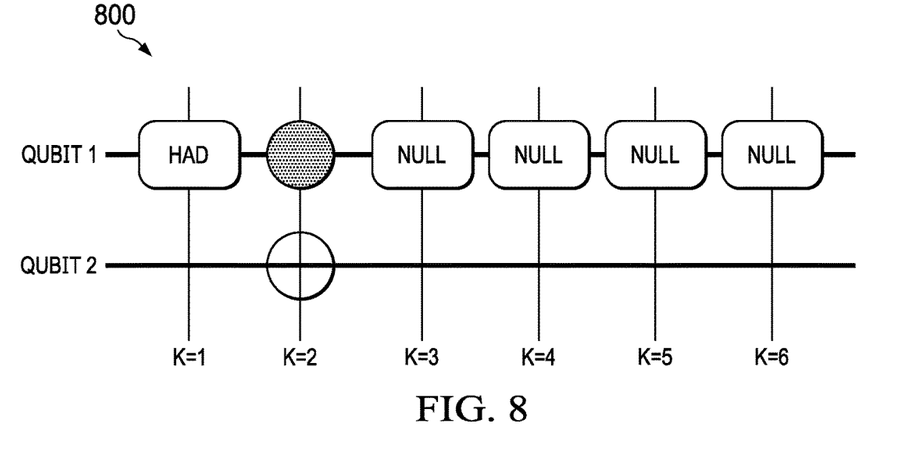
FIG. 8 depicts a diagram illustrating a result for an entangled Bell state gate operation in accordance with an illustrative embodiment.

FIG. 8 depicts a diagram illustrating a result for an entangled Bell state gate operation in accordance with an illustrative embodiment. Entangled Bell state gate operation 800 may be implemented in program and circuit modeling system 100 in FIG. 1.

A more nontrivial example for quantum computing can be composed making use of superposition, which is not possible classically. The present example supposes two qubits and six gate operation steps available in the process. The program targets are set to the following:

$$\left\{ \text{INPUT: } |00\rangle \to \text{OUTPUT: } \frac{1}{\sqrt{2}} |00\rangle + \frac{1}{\sqrt{2}} |11\rangle \right\}.$$

This setup requires that the quantum program consumes an input value of two qubits, both set to the zero state, and produces an entangled set of qubits. Repeated measurements on the output of the circuit should result in 50% of the outputs in the $|00\rangle$ state and 50% of the outputs in the $|11\rangle$ state. A schematic of the resulting circuit produced is shown in FIG. 8 in the parlance of quantum circuit diagrams.

Figure 9:
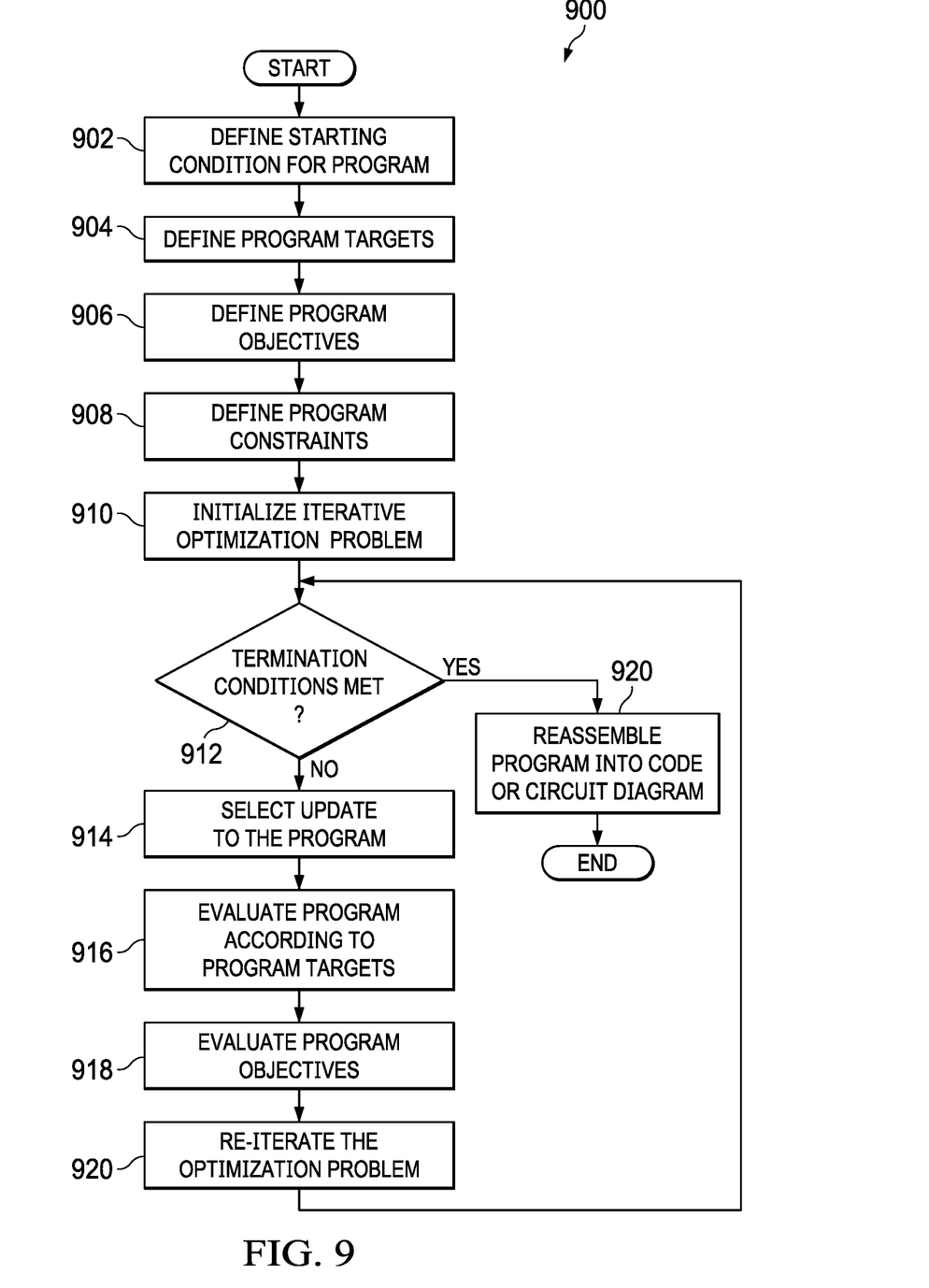
FIG. 9 depicts a flowchart illustrating a process for discovering optimal algorithms in accordance with an illustrative embodiment.

FIG. 9 depicts a flowchart illustrating a process for discovering optimal algorithms in accordance with an illustrative embodiment. Process 900 may be implemented to discover conventional or quantum computing algorithms. Process 900 can be implemented in hardware (including quantum computer hardware), software, or both. When implemented in software, the process can take the form of program code that is run by one of more processor units located in one or more hardware devices in one or more computer systems. Process 900 might be implemented in program and circuit modeling system 100 in FIG. 1.

Process 900 begins by defining an initial starting condition for a program (operation 902) and defining a number of program targets, wherein the program targets map program user-specified inputs to expected outputs (operation 904).

Process 900 also defines a number of program objectives (operation 906). Program objectives may comprise, e.g., minimizing a function of total error differences across all the program targets, minimizing a circuit depth of the program, minimizing a number of instances of an operation or set of operations within the program, restricting all program operations to a specified set of operations, minimizing usage of specified resources, or maximizing usage of specified resources.

Process 900 defines a number of program constraints (operation 908). The program constraints may comprise, e.g., enforcing a sum of total error differences across all the program targets within a specified maximum, enforcing a circuit depth of the program within a specified maximum, enforcing a number of instances of an operation or set of operations within the program within a specified maximum, specifying a set of operations for all program operations, enforcing usage of specified resources within a specified maximum, or enforcing usage of specified resources over a specified minimum.

Process 900 then initializes an iterative optimization problem to solve for the resulting program (operation 910).

Process 900 determines if defined termination conditions have been met according to the program targets and optimization objectives (operation 912).

If the termination conditions have not been met, an update to the program is selected by addition or subtraction of operations (operation 914).

The program is evaluated according to the program targets (operation 916). During evaluation, for each program target, a representation of a program memory with program target inputs is initialized, the program is executed, and final memory values are recorded as outputs generated by the program. The program may be executed in a hardware instance (including quantum hardware) or a software simulation of hardware. Software simulation of hardware may be done by sequentially retrieving the next program operation, applying the next program operation, and updating a program memory. The software simulation may simulate a quantum computer by sequentially retrieving a next quantum gate operation and corresponding matrix, assembling a quantum memory state update matrix, and applying the state update matrix to update a quantum memory. Simulating a quantum computer may also comprise modeling noise effects.

The program objectives are then evaluated (operation 918). The program objectives may be evaluated by comparing the recorded outputs generated by the program to the expected outputs, calculating the program objectives as a function of a difference between the recorded outputs and the expected outputs, and determining a corresponding program change as a function of the program objectives. The optimization problem is then re-iterated (operation 920).

If the termination conditions are met, the program is reassembled into an instruction set (operation 922). The instruction set may comprise code, a circuit, or a combination of code and a circuit. Process 900 then ends.

Figure 10:
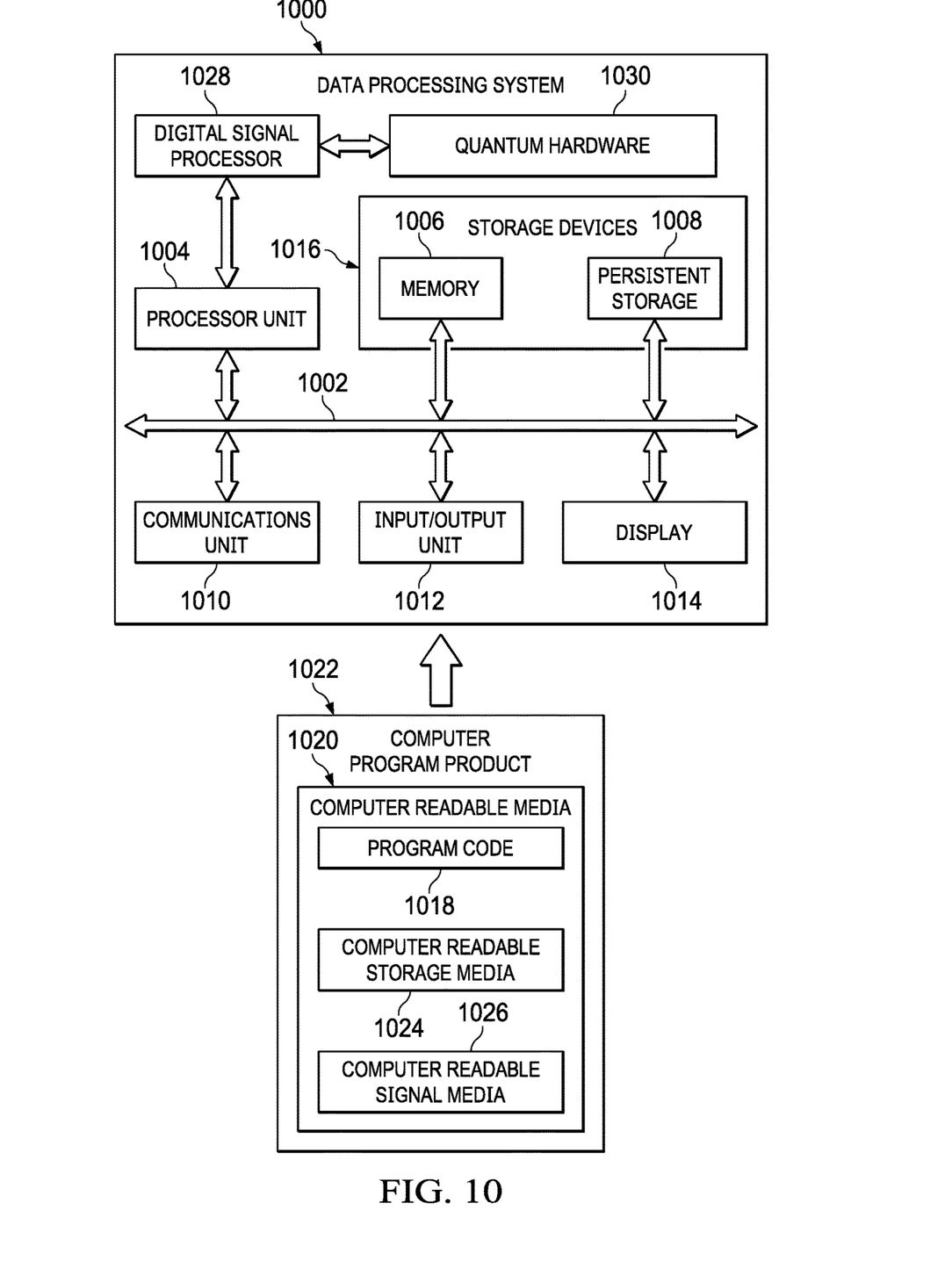
FIG. 10 depicts a block diagram of a data processing system in accordance with an illustrative embodiment.

Turning now to FIG. 10, an illustration of a block diagram of a data processing system is depicted in accordance with an illustrative embodiment. Data processing system might be an example of computer system 150 in FIG. 1. Data processing system 1000 might be used to implement one or more computers to carry out process operations shown in FIGS. 2-9. In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation. In an embodiment, processor unit 1004 comprises one or more conventional general-purpose central processing units (CPUs). Processor unit 1004 may send instructions to and from digital signal processor (DSP) 1028. DSP 1028 in turn sends analog or hybrid signals to and from quantum hardware 1030.

Quantum hardware 1030 may comprise quantum circuits based on qubits (quantum bits). Qubits are traditionally used to simulate a 1 or 0 state, or in a superposition of the 1 and 0 states. However, when measured, the qubit may be in an infinite number of states depending on the qubit's quantum state immediately prior to measurement when using a Bloch sphere representation. The quantum circuits may comprise a number of reversible quantum gates in which computational processes are logically reversible.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer-usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. Computer program product 1022 might be for aligning reference frames for an augmented reality (AR) display. In one example, computer-readable media 1020 may be computer-readable storage media 1024 or computer-readable signal media 1026.

In these illustrative examples, computer-readable storage media 1024 is a physical or tangible storage device used to store program code 1018 rather than a medium that propagates or transmits program code 1018. Alternatively, program code 1018 may be transferred to data processing system 1000 using computer-readable signal media 1026.

Computer-readable signal media 1026 may be, for example, a propagated data signal containing program code 1018. For example, computer-readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for discovering optimal algorithms, the method comprising:
    defining a number of program targets for a program, wherein the program targets map program user-specified inputs to expected outputs;
    defining a number of program objectives;
    defining a number of program constraints;
    initializing an iterative optimization problem to solve for the program;
    determining if defined termination conditions have been met according to the program targets and optimization objectives;
    responsive to the defined termination conditions not being met:
        selecting an update to the program by addition or subtraction of operations;
        evaluating the program according to the program targets;
        comparing recorded program outputs to the expected outputs;
        calculating the program objectives as a function of a difference between the recorded outputs and the expected outputs;
        determining a corresponding program change as a function of the program objectives; and
        re-iterating the optimization problem; and
    responsive to the defined termination conditions being met, reassembling the program into an instruction set.

2. The method of claim 1, wherein the instruction set comprises:
   code;
   a circuit; or
   a combination of code and a circuit.

3. The method of claim 1, wherein the evaluating the program according to the program targets comprises, for each program target:
   initializing a representation of a program memory with program target inputs;
   executing the program; and
   recording final memory values as outputs generated by the program.

4. The method of claim 3, wherein the executing the program comprises executing the program in a hardware instance.

5. The method of claim 3, wherein the executing the program comprises executing the program in a software simulation of hardware.

6. The method of claim 5, wherein the executing the program in the software simulation of hardware comprises sequentially:
   retrieving a next program operation;
   applying the next program operation; and
   updating the program memory.

7. The method of claim 5, wherein the software simulation of hardware simulates a quantum computer by sequentially:
   retrieving a next quantum gate operation and corresponding matrix;
   assembling a quantum memory state update matrix; and
   applying the quantum memory state update matrix to update a quantum memory.

8. The method of claim 7 further comprising modeling noise effects.

9. The method of claim 1, wherein the number of program objectives comprises at least one of:
   minimizing a function of total error differences across all the program targets;
   minimizing a circuit depth of the program;
   minimizing a number of instances of an operation or set of operations within the program;
   restricting all program operations to a specified set of operations;
   minimizing usage of specified resources; or
   maximizing usage of specified resources.

10. The method of claim 1, wherein the number of program constraints comprises at least one of:
    enforcing a sum of total error differences across all the program targets within a specified maximum total error differences;
    enforcing a circuit depth of the program within a specified maximum circuit depth;
    enforcing a number of instances of an operation or set of operations within the program within a specified maximum number of instances;
    specifying a set of operations for all program operations;
    enforcing usage of specified resources within a specified maximum usage of the specified resources; or
    enforcing usage of specified resources over a specified minimum usage of the specified resources.

11. A system for discovering optimal algorithms, the system comprising:
    a storage device that stores program instructions; and
    one or more processors operably connected to the storage device and configured to execute the program instructions to cause the system to:
      define a starting condition for a program;
      define a number of program targets, wherein the program targets map program user-specified inputs to expected outputs;
      define a number of program objectives;
      define a number of program constraints;
      initialize an iterative optimization problem to solve for the program;
      determine if defined termination conditions have been met according to the program targets and optimization objectives;
      responsive to the defined termination conditions not being met:
        select an update to the program by addition or subtraction of operations;
        evaluate the program according to the program targets;
        compare recorded program outputs to the expected outputs;
        calculate the program objectives as a function of a difference between the recorded outputs and the expected outputs;
        determine a corresponding program change as a function of the program objectives; and
        re-iterate the optimization problem; and
      responsive to the defined termination conditions being met, reassemble the program into an instruction set.

12. The system of claim 11, wherein the instruction set comprises:
    code;
    a circuit; or
    a combination of code and a circuit.

13. The system of claim 11, wherein the evaluating the program according to the program targets comprises, for each program target:
    initializing a representation of a program memory with program target inputs;
    executing the program; and
    recording final memory values as outputs generated by the program.

14. The system of claim 13, wherein the executing the program comprises executing the program in a hardware instance.

15. The system of claim 13, wherein the executing the program comprises executing the program in a software simulation of hardware.

16. The system of claim 15, wherein the executing the program in the software simulation of hardware comprises sequentially:
    retrieving a next program operation;
    applying the next program operation; and
    updating a program memory.

17. The system of claim 15, wherein the software simulation of hardware simulates a quantum computer by sequentially:
    retrieving a next quantum gate operation and corresponding matrix;
    assembling a quantum memory state update matrix; and
    applying the quantum memory state update matrix to update a quantum memory.

18. The system of claim 17 further comprising modeling noise effects.

19. The system of claim 11, wherein the number of program objectives comprises at least one of:
    minimizing a function of total error differences across all the program targets;
    minimizing a circuit depth of the program;
    minimizing a number of instances of an operation or set of operations within the program;

restricting all program operations to a specified set of operations;
minimizing usage of specified resources; or
maximizing usage of specified resources.

20. The system of claim 11, wherein the number of program constraints comprises at least one of:
enforcing a sum of total error differences across all the program targets within a specified maximum total error differences;
enforcing a circuit depth of the program within a specified maximum circuit depth;
enforcing a number of instances of an operation or set of operations within the program within a specified maximum number of instances;
specifying a set of operations for all program operations;
enforcing usage of specified resources within a specified maximum usage of the specified resources; or
enforcing usage of specified resources over a specified minimum usage of the specified resources.

21. A computer program product for discovering optimal algorithms, the computer program product comprising:
a computer-readable storage medium having program instructions embodied thereon to perform steps of:
defining a starting condition for a program;
defining a number of program targets, wherein the program targets map program user-specified inputs to expected outputs;
defining a number of program objectives;
defining a number of program constraints;
initializing an iterative optimization problem to solve for the program;
determining if defined termination conditions have been met according to the program targets and optimization objectives;
responsive to the defined termination conditions not being met:
selecting an update to the program by addition or subtraction of operations;
evaluating the program according to the program targets;
comparing recorded program outputs to the expected outputs;
calculating the program objectives as a function of a difference between the recorded outputs and the expected outputs;
determining a corresponding program change as a function of the program objectives; and
re-iterating the optimization problem; and
responsive to the defined termination conditions being met, reassembling the program into an instruction set.

22. The computer program product of claim 21, wherein the instruction set comprises:
code;
a circuit; or
a combination of code and a circuit.

23. The computer program product of claim 21, wherein the evaluating the program according to the program targets comprises, for each program target:
initializing a representation of a program memory with program target inputs;
executing the program; and
recording final memory values as outputs generated by the program.

24. The computer program product of claim 23, wherein the executing the program comprises executing the program in a hardware instance.

25. The computer program product of claim 23, wherein the executing the program comprises executing the program in a software simulation of hardware.

26. The computer program product of claim 25, wherein the executing the program in the software simulation of hardware comprises sequentially:
retrieving a next program operation;
applying the next program operation; and
updating the program memory.

27. The computer program product of claim 25, wherein the software simulation of the hardware simulates a quantum computer by sequentially:
retrieving a next quantum gate operation and corresponding matrix;
assembling a quantum memory state update matrix; and
applying the quantum memory state update matrix to update a quantum memory.

28. The computer program product of claim 27 further comprising instructions for modeling noise effects.

29. The computer program product of claim 21, wherein the number of program objectives comprises at least one of:
minimizing a function of total error differences across all the program targets;
minimizing a circuit depth of the program;
minimizing a number of instances of an operation or set of operations within the program;
restricting all program operations to a specified set of operations;
minimizing usage of specified resources; or
maximizing usage of specified resources.

30. The computer program product of claim 21, wherein the number of program constraints comprises at least one of:
enforcing a sum of total error differences across all the program targets within a specified maximum total error differences;
enforcing a circuit depth of the program within a specified maximum circuit depth;
enforcing a number of instances of an operation or set of operations within the program within a specified maximum number of instances;
specifying a set of operations for all program operations;
enforcing usage of specified resources within a specified maximum usage of the specified resources; or
enforcing usage of specified resources over a specified minimum usage of the specified resources.

31. A computer-implemented method for discovering optimal quantum computing algorithms, the method comprising:
defining a starting condition for a program;
defining a number of program targets, wherein the program targets map program user-specified inputs to expected outputs;
defining a number of program objectives;
defining a number of program constraints;
initializing an iterative optimization problem to solve for the program;
determining if defined termination conditions have been met according to the program targets and optimization objectives;
responsive to the defined termination conditions not being met:
selecting an update to the program by addition or subtraction of operations;
evaluating the program according to the program targets;
comparing recorded program outputs to the expected outputs;

calculating the program objectives as a function of a difference between the recorded outputs and the expected outputs;
determining a corresponding program change as a function of the program objectives; and
re-iterating the optimization problem; and
responsive to the defined termination conditions being met, reassembling the program into a quantum instruction set.

32. The method of claim 31, wherein the quantum instruction set comprises:
quantum program code;
a quantum circuit; or
a combination of quantum program code and a quantum circuit.

33. The method of claim 31 wherein the evaluating the program according to the program targets comprises, for each program target:
initializing a representation of a program memory with program target inputs;
executing the program; and
recording final memory values as outputs generated by the program.

34. The method of claim 33, wherein the executing the program comprises executing the program in a quantum hardware instance.

35. The method of claim 33, wherein the executing the program comprises executing the program in a software simulation of quantum hardware by sequentially:
retrieving a next quantum gate operation and corresponding matrix;
assembling a quantum memory state update matrix; and
applying the quantum memory state update matrix to update a quantum memory.

36. A system for discovering optimal quantum computing algorithms, the system comprising:
a storage device that stores program instructions; and
one or more quantum processors operably connected to the storage device and configured to execute the program instructions to cause the system to:
define a starting condition for a program;
define a number of program targets, wherein the program targets map program user-specified inputs to expected outputs;
define a number of program objectives;
define a number of program constraints;
initialize an iterative optimization problem to solve for the program;
determine if defined termination conditions have been met according to the program targets and optimization objectives;
responsive to the defined termination conditions not being met:
select an update to the program by addition or subtraction of operations;
evaluate the program according to the program targets;
compare recorded program outputs to the expected outputs;
calculate the program objectives as a function of a difference between the recorded outputs and the expected outputs;
determine a corresponding program change as a function of the program objectives; and
re-iterate the optimization problem; and
responsive to the defined termination conditions being met, reassemble the program into a quantum instruction set.

37. The system of claim 36, wherein the instruction set comprises:
code;
a circuit; or
a combination of code and a circuit.

38. The system of claim 36, wherein the evaluating the program according to the program targets comprises, for each program target:
initializing a representation of a program memory with program target inputs;
executing the program by sequentially:
retrieving a next quantum gate operation and corresponding matrix;
assembling a quantum memory state update matrix; and
applying the quantum memory state update matrix to update a quantum memory; and
recording final memory values as outputs generated by the program.

39. A computer-implemented method for discovering optimal algorithms, the method comprising:
defining a number of program targets for a program, wherein the program targets map program user-specified inputs to expected outputs;
defining a number of program objectives;
defining a number of program constraints;
initializing an iterative optimization problem to solve for the program;
determining if defined termination conditions have been met according to the program targets and optimization objectives;
responsive to the defined termination conditions not being met:
selecting an update to the program by addition or subtraction of operations;
evaluating the program according to the program targets;
evaluating the number of program objectives; and
re-iterating the optimization problem; and
responsive to the defined termination conditions being met, reassembling the program into an instruction set,
wherein the evaluating the number of program objectives comprises:
comparing recorded outputs generated by the program to the expected outputs;
calculating the number of program objectives as a function of a difference between the recorded outputs and the expected outputs; and
determining a corresponding program change as a function of the number of program objectives.

40. A system for discovering optimal algorithms, the system comprising:
a storage device that stores program instructions; and
one or more processors operably connected to the storage device and configured to execute the program instructions to cause the system to:
define a starting condition for a program;
define a number of program targets, wherein the program targets map program user-specified inputs to expected outputs;
define a number of program objectives;
define a number of program constraints;
initialize an iterative optimization problem to solve for the program;
determine if defined termination conditions have been met according to the program targets and optimization objectives;

responsive to the defined termination conditions not being met:
  select an update to the program by addition or subtraction of operations;
  evaluate the program according to the program targets;
  evaluate the number of program objectives; and
  re-iterate the optimization problem; and
responsive to the defined termination conditions being met, reassemble the program into an instruction set,
wherein the evaluating the number of program objectives comprises:
  comparing recorded outputs generated by the program to the expected outputs;
  calculating the number of program objectives as a function of a difference between the recorded outputs and the expected outputs; and
  determining a corresponding program change as a function of the number of program objectives.

41. A computer program product for discovering optimal algorithms, the computer program product comprising:
a computer-readable storage medium having program instructions embodied thereon to perform steps of:
defining a starting condition for a program;
defining a number of program targets, wherein the program targets map program user-specified inputs to expected outputs;
defining a number of program objectives; defining a number of program constraints;
initializing an iterative optimization problem to solve for the program;
determining if defined termination conditions have been met according to the program targets and optimization objectives;
responsive to the defined termination conditions not being met:
  selecting an update to the program by addition or subtraction of operations;
  evaluating the program according to the program targets;
  evaluating the number of program objectives; and
  re-iterating the optimization problem; and
responsive to the defined termination conditions being met, reassembling the program into an instruction set,
wherein the evaluating the number of program objectives comprises:
  comparing recorded outputs generated by the program to the expected outputs;
  calculating the number of program objectives as a function of a difference between the recorded outputs and the expected outputs; and
  determining a corresponding program change as a function of the number of program objectives.

\* \* \* \* \*